US008510731B2

(12) United States Patent
Aiba et al.

(10) Patent No.: US 8,510,731 B2
(45) Date of Patent: Aug. 13, 2013

(54) DEVICE DRIVER UPDATING METHOD AND PROGRAM, INFORMATION PROCESSING APPARATUS AND SERVER APPARATUS USING THE SAME, AND STORAGE FOR STORING DEVICE DRIVER UPDATING PROGRAM

(75) Inventors: Tsukasa Aiba, Kanagawa (JP); Hisashi Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 642 days.

(21) Appl. No.: 12/546,776

(22) Filed: Aug. 25, 2009

(65) Prior Publication Data

US 2010/0005460 A1 Jan. 7, 2010

Related U.S. Application Data

(63) Continuation of application No. 10/263,463, filed on Oct. 2, 2002, now Pat. No. 7,600,226.

(30) Foreign Application Priority Data

Oct. 3, 2001 (JP) .................................. 2001-306998
Sep. 11, 2002 (JP) .................................. 2002-265175

(51) Int. Cl.
*G06F 9/445* (2006.01)
*G06F 9/44* (2006.01)
(52) U.S. Cl.
USPC ............ 717/176; 717/171; 717/174; 717/178
(58) Field of Classification Search
None
See application file for complete search history.

(56) References Cited

U.S. PATENT DOCUMENTS

| | | | |
|---|---|---|---|
| 5,845,077 A | 12/1998 | Fawcett | 395/200.51 |
| 6,023,585 A | 2/2000 | Perlman et al. | 395/712 |
| 6,151,708 A | 11/2000 | Pedrizetti et al. | 717/11 |
| 6,167,358 A | 12/2000 | Othmer et al. | 702/188 |
| 6,532,495 B1 | 3/2003 | Welles, II et al. | 709/232 |
| 6,607,314 B1 | 8/2003 | McCannon et al. | 400/62 |
| 6,681,392 B1* | 1/2004 | Henry et al. | 717/176 |
| 6,826,581 B2 | 11/2004 | Moslander et al. | 707/203 |
| 6,959,437 B2 | 10/2005 | Schacht et al. | 719/321 |
| 6,990,659 B1 | 1/2006 | Imai | 717/171 |
| 7,451,442 B2* | 11/2008 | Parry | 717/176 |
| 7,461,375 B2* | 12/2008 | Kazumi et al. | 717/176 |
| 7,600,226 B2 | 10/2009 | Aiba et al. | |
| 7,743,374 B2* | 6/2010 | Machida | 717/176 |

(Continued)

FOREIGN PATENT DOCUMENTS

JP 2003-177989 A 6/2003

*Primary Examiner* — Thuy Dao
(74) *Attorney, Agent, or Firm* — Fitzpatrick, Cella, Harper & Scinto

(57) ABSTRACT

An information processing apparatus has a storage device that stores a device driver which incorporates access information regarding access to the server apparatus and a property display screen with instruction items for instructing a device driver request; a notification unit that, based on an instruction to the instruction items on the property display screen, refers to the access information and notifies the access information to an application that is capable of processing page information, in order to obtain driver update page information from the server apparatus; and an updating control unit that, based on an instruction to an update instruction section to request automatic update that is provided on a driver update page created based on the driver update page information obtained, controls a process to obtain device driver update information sent from the server apparatus and update the device driver stored in the storage device.

9 Claims, 10 Drawing Sheets

(56) References Cited

U.S. PATENT DOCUMENTS

| | | | |
|---|---|---|---|
| 7,831,969 B2* | 11/2010 | Kadota | 717/178 |
| 8,250,563 B2* | 8/2012 | Chefalas et al. | 717/171 |
| 2002/0067504 A1 | 6/2002 | Salgado et al. | 358/1.15 |
| 2002/0083121 A1* | 6/2002 | Chang et al. | 709/201 |
| 2002/0083431 A1* | 6/2002 | Machida | 717/174 |
| 2002/0095501 A1 | 7/2002 | Chiloyan et al. | 709/227 |
| 2002/0174264 A1 | 11/2002 | Fuller et al. | 709/321 |
| 2004/0015961 A1 | 1/2004 | Chefalas et al. | 717/178 |
| 2008/0104585 A1* | 5/2008 | Kamijima | 717/171 |

\* cited by examiner

Memory Map of Storage Medium

DEVICE DRIVER UPDATING METHOD AND PROGRAM, INFORMATION PROCESSING APPARATUS AND SERVER APPARATUS USING THE SAME, AND STORAGE FOR STORING DEVICE DRIVER UPDATING PROGRAM

This application is a continuation of application Ser. No. 10/263,463 filed Oct. 2, 2002.

FIELD OF THE INVENTION

The present invention relates to an information processing apparatus that is capable of communicating via a predetermined communication medium with a server apparatus that manages device drivers that control devices that perform predetermined data processing, as well as a server apparatus, a driver updating method, a program and a storage.

DESCRIPTION OF RELATED ART

Conventionally, printer driver in information processing apparatus may be updated in such a manner that a user inquires a support center for printers or printer drivers, and the support center sends a flexible disk or a CD-ROM containing the update printer drivers to the user. Another method is for the user to search download sites for printer drivers and to download a printer driver.

These methods required that the user know version information regarding the user's current printer driver, and whether the printer driver should be updated was decided upon comparing the current version with the latest version. Further, the methods also involved the user having to manually instruct an installation of the latest printer driver obtained to update the old printer driver.

In one method, print-related user software is delivered from a print management server to a user's server and the software is installed. However, this method entails a problem in that it requires a completely established network and an administrator for managing the network.

In another method, printer drivers are updated by having the printer drivers themselves periodically communicate with an external information site and self-assess whether to update. However, due to the fact that the printer drivers themselves periodically communicate with an external information site rather than being constantly connected, there is a problem in that communication expenses are incurred without the user's permission every time a periodic communication is made.

In the conventional methods described above, there was a problem in that finding the latest printer driver was time-consuming and onerous for the user.

SUMMARY OF THE INVENTION

The present invention was conceived in order to solve the above problems, and the present invention relates to providing an information processing apparatus, a driver updating method, a program and a storage that, individually or collectively, can freely create a highly convenient driver updating environment, in which, when updating a device driver, the operational burden in terms of various network information that must be set by the user is reduced and an updating processing of device drivers can be efficiently done with simple operations on an information processing apparatus using a general-purpose browser.

The present invention also relates to providing a server apparatus, a driver updating method, a program and a storage that, individually or collectively, can freely create a highly convenient driver updating environment, in which a series of operations to refer to update information of a device driver becomes a starting point to automatically update the device driver on an information processing apparatus while presenting to the information processing apparatus information required for driver update.

An embodiment of the present invention pertains to an information processing apparatus that is capable of communicating via a predetermined communication medium with a server apparatus that manages device drivers that control devices that perform predetermined data processing. In one aspect, the information processing apparatus has a storage device that stores a device driver which incorporates access information regarding access to the server apparatus and a property display screen with instruction items for instructing a device driver request; a notification unit that, based on an instruction to the instruction items on the property display screen, refers to the access information and notifies the access information to an application that is capable of processing page information, in order to obtain driver update page information from the server apparatus; and an updating control unit that, based on an instruction to an update instruction section to request automatic update that is provided on a driver update page created based on the driver update page information obtained, controls a process to obtain device driver update information sent from the server apparatus and update the device driver stored in the storage device.

Another embodiment of the present invention pertains to a server apparatus that is capable of communicating via a predetermined communication medium with an information processing apparatus that stores a device driver that controls a device that performs predetermined data processing. In one aspect, the server apparatus has a driver management unit that stores and manages at least one device driver based on management information; an obtaining unit that obtains management information of the device driver that is used in the information processing apparatus; a page information creating unit that creates, according to a request for driver update page from the information processing apparatus, driver update page information that includes management information of the device driver currently used that is obtained through the obtaining unit, management information of the at least one device driver managed by the driver management unit, and detailed information including information regarding changes made in an update device driver managed with respect to an old device driver; and a transmission control unit that, in response to an instruction to the driver update page information created and transferred to a request source, which is the information processing apparatus, controls a process to send the latest device driver that is stored in and managed by the driver management unit to the request source, which is the information processing apparatus.

Other features and advantages of the present invention will be apparent from the following description taken in conjunction with accompanying drawings, in which like reference characters designate the same or similar parts throughout thereof.

DESCRIPTION OF THE PREFERRED EMBODIMENTS

Figure 1:
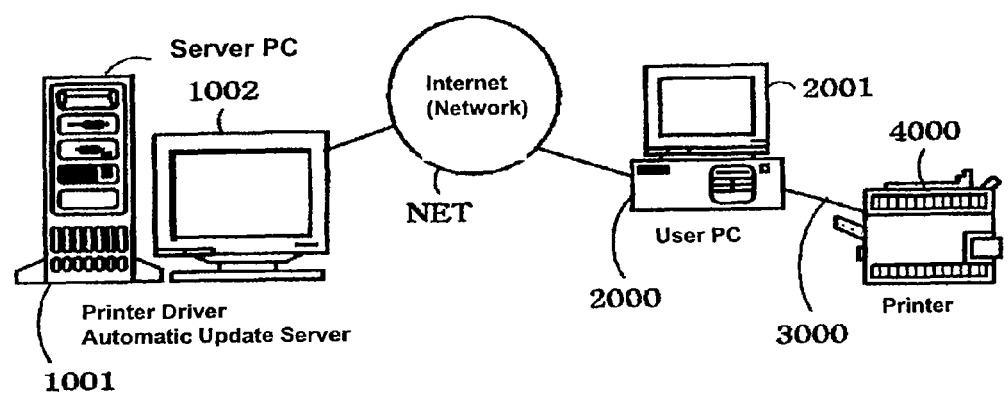
FIG. 1 schematically shows a configuration of a printing system to which a server apparatus and a data processing apparatus in accordance with an embodiment of the present invention are applicable.

In FIG. 1, a printer 4000 is connected to a user PC 2000 via an interface 3000. The user PC 2000 can be connected with a network NET such as the Internet. On the other side of the NET is connected a server PC 1001 on a printer manufacturer's side that automatically updates printer drivers.

Reference numerals 1002 and 2001 denote each a display device comprising a CRT or an LCD.

Figure 2:
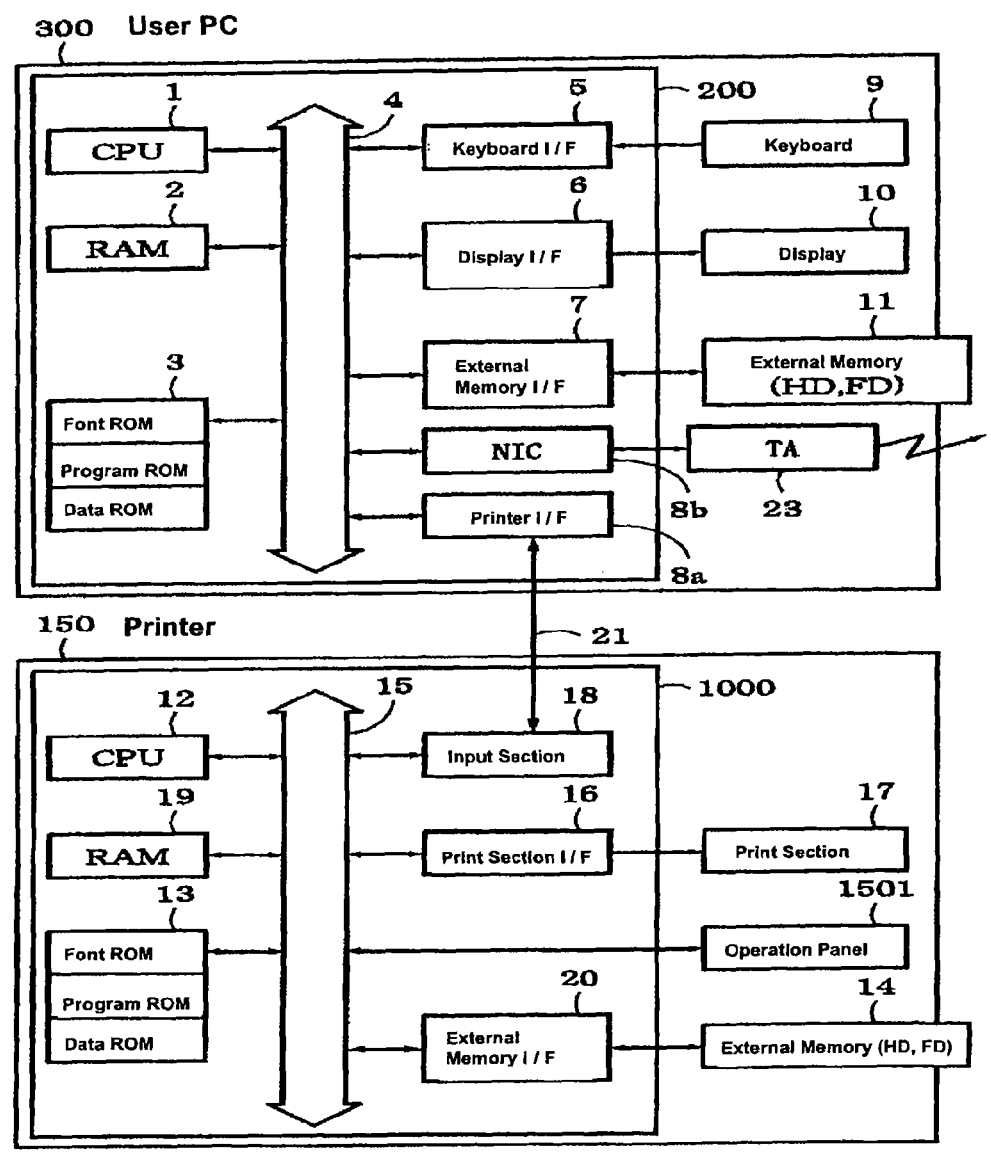
FIG. 2 shows a block diagram illustrating a configuration of a printing system to which a data processing apparatus in accordance with an embodiment of the present invention is applicable.

FIG. 2 is a block diagram illustrating the configuration of a printing system to which a data processing apparatus according to the present invention is applicable.

In FIG. 2, reference numeral 300 denotes a user PC equipped with a CPU 1, which executes processing of documents containing graphics, images, characters and tables (including spreadsheets) based on processing programs stored in a program ROM of a ROM 3 or an external memory 11. The CPU 1 collectively controls various devices connected to a system bus 4.

An operating system program (hereinafter called OS), which is a control program for the CPU 1, is stored in the program ROM of the ROM 3 or the external memory 11. Font data for fonts used in the document processing described above are stored in a font ROM of the ROM 3 or the external memory 11. Various data used in these processing are stored in a data ROM of the ROM 3 or the external memory 11.

Reference numeral 2 denotes a RAM that functions as a main memory and/or a work area of the CPU 1. Reference numeral 5 denotes a keyboard interface that controls inputs from a keyboard 9 or pointing devices, which are omitted from drawings. Reference numeral 6 denotes a display interface that controls displays on a display 10.

In addition, there are other devices that are omitted from drawings but can be connected, such as a scanner interface and a scanner, a digital camera interface and a digital camera, a facsimile machine interface and a facsimile machine, a mouse interface and a mouse, a speaker interface and speakers, a sound source interface and a sound source device, a telephone interface and a telephone, and a copier interface and a copier.

Reference numeral 7 denotes an external memory interface that controls access to the external memory 11, such as a hard disk (HD) or a Floppy (a registered trademark) disk (FD), that stores a boot program, various applications, font data, user files, editing files, and printer drivers.

Reference numeral 8a denotes a printer interface that connects with a printer 150 via a predetermined bi-directional interface (interface) 21 and that executes communication control processing with the printer 150.

Reference numeral 8b denotes a network interface (NIC) that accesses the Internet NET via a terminal device (TA) 23 and communicates with the server PC 1001 in FIG. 1 according to a predetermined protocol to perform a notification processing of system environment information, a download processing of a driver managed by the server PC 1001 for the printer 150, and an obtaining processing to obtain driver update page information (HTML).

The CPU 1 executes a developing (i.e., rasterizing) processing of outline font to a display information RAM set in the RAM 2, for example, that makes WYSIWYG possible on the display 10.

In addition, the CPU 1 opens various registered windows based on commands instructed through a mouse cursor, which is omitted from drawings, on the display 10 to execute various data processing. To execute a printing, the user can open a window for print settings and set print processing methods for the printer driver, including printer setting and print mode selection.

In the printer 150, reference numeral 12 denotes a printer CPU (CPU) that outputs to a print section (printer engine) 17 image signals as output information through a print section interface 16, which is connected to a system bus 15 based on a control program stored in a program ROM of a ROM 13 or on a control program stored in an external memory 14.

Additionally, the program ROM of the ROM 13 stores a control program for the CPU 12. Font data used to create the output information are stored in a font ROM of the ROM 13; information that is used on the user PC 300 is stored in a data ROM of the ROM 13 when the printer does not have an external memory 14, such as a hard disk.

The CPU 12 can communicate with the user PC 300 via an input section 18, so that information in the printer 150 can be communicated to the user PC 300. Reference numeral 19 denotes a RAM that functions as a main memory and/or a work area of the CPU 12, and its memory capacity can be expanded through optional RAMs connected to expansion ports omitted from drawings.

The RAM 19 is used as an output information development area, a system environment information (including classification information of OS) storage area and NVRAM. Access to the external memory 14, which is a hard disk (HD) or an IC card, is controlled by an external memory interface 20. The external memory 14 is connected as an optional device and stores font data, emulation programs and form data.

Reference numeral 1501 denotes an operation panel with switches and LED displays provided for operations. The external memory 14 is not limited to one in number but one or a plurality of external memories may be provided. Alternatively, there may be provided a plurality of external memories 14 such as an optional font card that stores optional fonts in addition to built-in fonts, as well as memories that store programs to interpret printer control languages under different language systems.

The printer 150 may also be provided with an NVRAM, omitted from drawings, to store printer mode setting information from the operation panel 1501.

Figure 3:
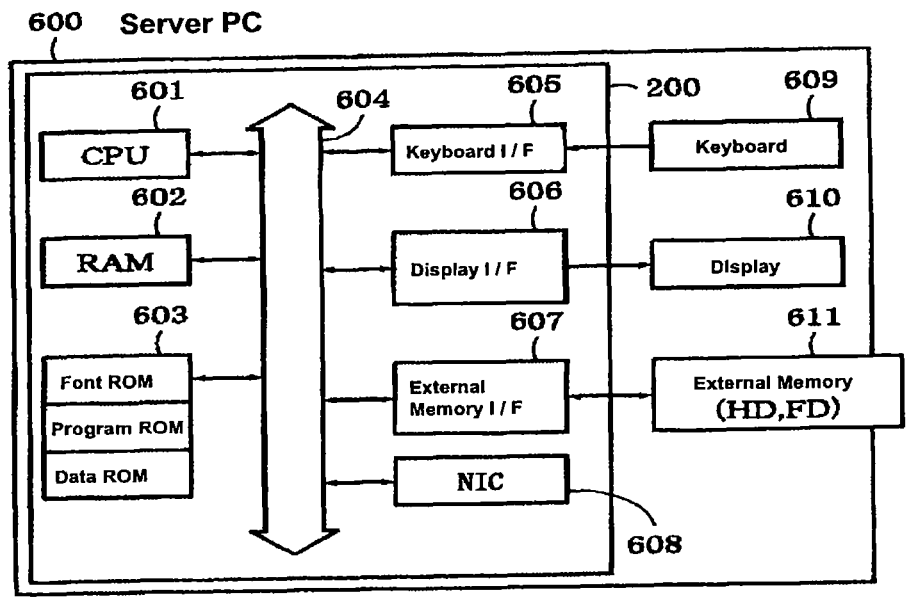
FIG. 3 shows a block diagram illustrating a configuration of a server apparatus in accordance with one embodiment of the present invention.

FIG. 3 shows a block diagram illustrating a configuration of a server apparatus in accordance with a first embodiment of the present invention. The server apparatus is configured such that it is capable of communicating under a predetermined protocol with any user PC via the Internet NET.

In FIG. 3, reference numeral 600 denotes a server PC equipped with a CPU 601, which executes processing of documents containing graphics, images, characters and tables (including spreadsheets) based on processing programs stored in a program ROM of a ROM 603 or an external memory 611. The CPU 601 collectively controls various devices connected to a system bus 604.

An operating system program (hereinafter called OS), which is a control program for the CPU 601, is stored in the program ROM of the ROM 603 or the external memory 611; font data for fonts used in the document processing described above are stored in a font ROM of the ROM 603 or the external memory 611. Various data used in these processing are stored in a data ROM of the ROM 603 or the external memory 611.

Reference numeral 602 denotes a RAM that functions as a main memory and/or a work area of the CPU 601. Reference numeral 605 denotes a keyboard interface that controls inputs from a keyboard 609 or pointing devices, which are omitted from drawings. Reference numeral 606 denotes a display interface that controls displays on a display 610.

Reference numeral 607 denotes an external memory interface that controls access to the external memory 611, such as a hard disk (HD) or a flexible disk (FD), that stores a boot program, various applications, font data, user files, editing files, printer drivers and printer driver downloading programs for various models in various versions, and various programs that realize Web server functions.

Reference numeral 608 denotes a network interface card (NIC) that executes communication control processing with the user PC 300 via a terminal adapter (including routers), public telephone lines or the Internet NET.

In addition, the CPU 601 opens various registered windows based on commands instructed through a mouse cursor, which is omitted from drawings, on the display 610 to execute various data processing. To execute a printing, the user can open a window for print settings and set print processing methods for the printer driver, including printer setting and print mode selection.

Furthermore, the CPU 601 responds to a download request from the user PC 300 via the NIC 608 based on a printer management program stored in the external memory 611, makes a homepage for device driver update viewable for the user PC 300 in response to a browser operation performed on the user PC 300, and is able to obtain system environment information of the user PC 300.

In the server apparatus configured as described above, there is provided a driver updating method performed at the server apparatus (the server PC 600 in FIG. 3) that is capable of communicating via a predetermined communication medium (the Internet NET) with an information processing apparatus that stores device drivers to control devices that perform predetermined data processing. The driver updating method includes the following steps, which is executed based on a processing shown in FIG. 5: storing and managing device drivers based on management information stored in the external memory 11; obtaining management information of a device driver used in the user PC 300; having the CPU 601 create, based on a driver update processing program stored in the external memory 611 and in response to a driver update page request (based on an instruction given on the driver update page displayed (made viewable) on the display 10 of the user PC 300) from the user PC 300, driver update page information that includes the management information of the device driver currently used that was obtained, management information of the device driver managed by a driver management unit, and detailed information including information regarding changes made to the device driver managed with respect to the old device driver; and downloading, in response to an instruction to the driver update page information created and transferred to the request source, which is the user PC, the latest device driver stored in and managed by the external memory 611 to the request source, which is the information processing apparatus.

Figure 4:
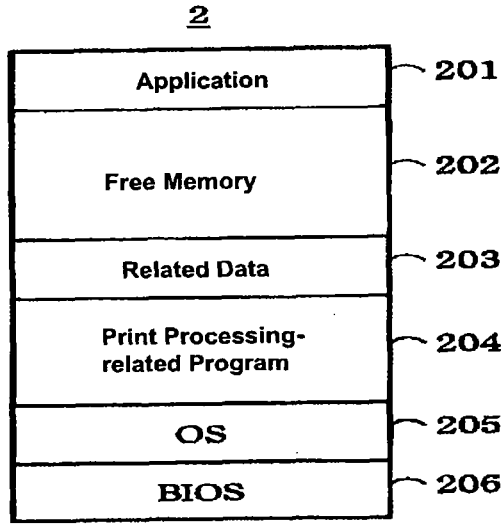
FIG. 4 shows is a drawing illustrating a memory map of a RAM in FIG. 2.

FIG. 4 is a drawing illustrating a memory map of the RAM 2 in FIG. 2, which is a memory map when a printer driver program has been loaded on the RAM 2 of the user PC 300 and is ready to be executed. The printer driver program according to the present embodiment exists as part of a print processing-related program 204.

In FIG. 2, reference numeral 201 denotes an application whose execution is managed by an OS 205. Reference numeral 202 denotes a free memory that functions as a work memory for the CPU 1. Reference numeral 203 denotes related data. Reference numeral 206 denotes BIOS that manages the system configuration of input/output devices.

In a printing system configured as described above, the user PC 2000 is provided with units (browser software and network interface) that make it possible for the user PC 2000 to connect with a homepage of a given URL via the Internet NET.

The user PC 2000 is provided with a printer driver (installed on the external memory 11), which has a user interface (UI) for print settings, so that a user can freely perform operations on the display 10. In addition to switches for various settings, a display to confirm version information and a button BT 1 on the same screen (see FIG. 6 described later) for automatic updating are provided on the user interface. When the automatic updating button BT 1 is pressed by the user, the printer driver starts the browser software via the OS, a URL determined in advance and stored in the printer driver is notified to the browser software, a connection is made with the URL via the Internet NET, and the homepage is displayed on the browser software. The updating button is a favorable example of an update instruction section. The update instruction section may be in a mode other than the updating button, such as a link section to call up functions.

The screen of the homepage that appears has a confirmation button (see FIG. 7 described later), which makes it possible, with the user's permission, to send the user PC 2000's system environment information and the existing printer driver's version information from the user PC 2000, to be received by the server PC 1001, which is for automatic update of printer drivers.

When doing this, the server PC 1001 for automatic update of printer drivers determines whether the user PC 2000's printer driver can be updated based on various data obtained from the user PC 2000 (including the user PC 2000's system environment information and version information of the printer driver currently set in the user PC 2000) and on the version information of the latest printer driver managed by the server PC 1001 for automatic update of printer drivers. If the user PC 2000's printer driver can be updated, the server PC 1001 for automatic update of printer drivers adds, to screen information (in HTML) of the homepage that is to be sent back to the user PC 2000, information for displaying automatic update items such as buttons to make automatic update possible, and sends the screen information to the user PC 2000. When the automatic update item button is pressed on the user PC 2000 the user's permission is obtained, and the latest printer driver is downloaded to the user PC 2000 from the server PC 1001 for automatic update of printer drivers, and the printer driver is automatically updated. Next, we will describe the details of a specific example using FIG. 5.

Figure 5:
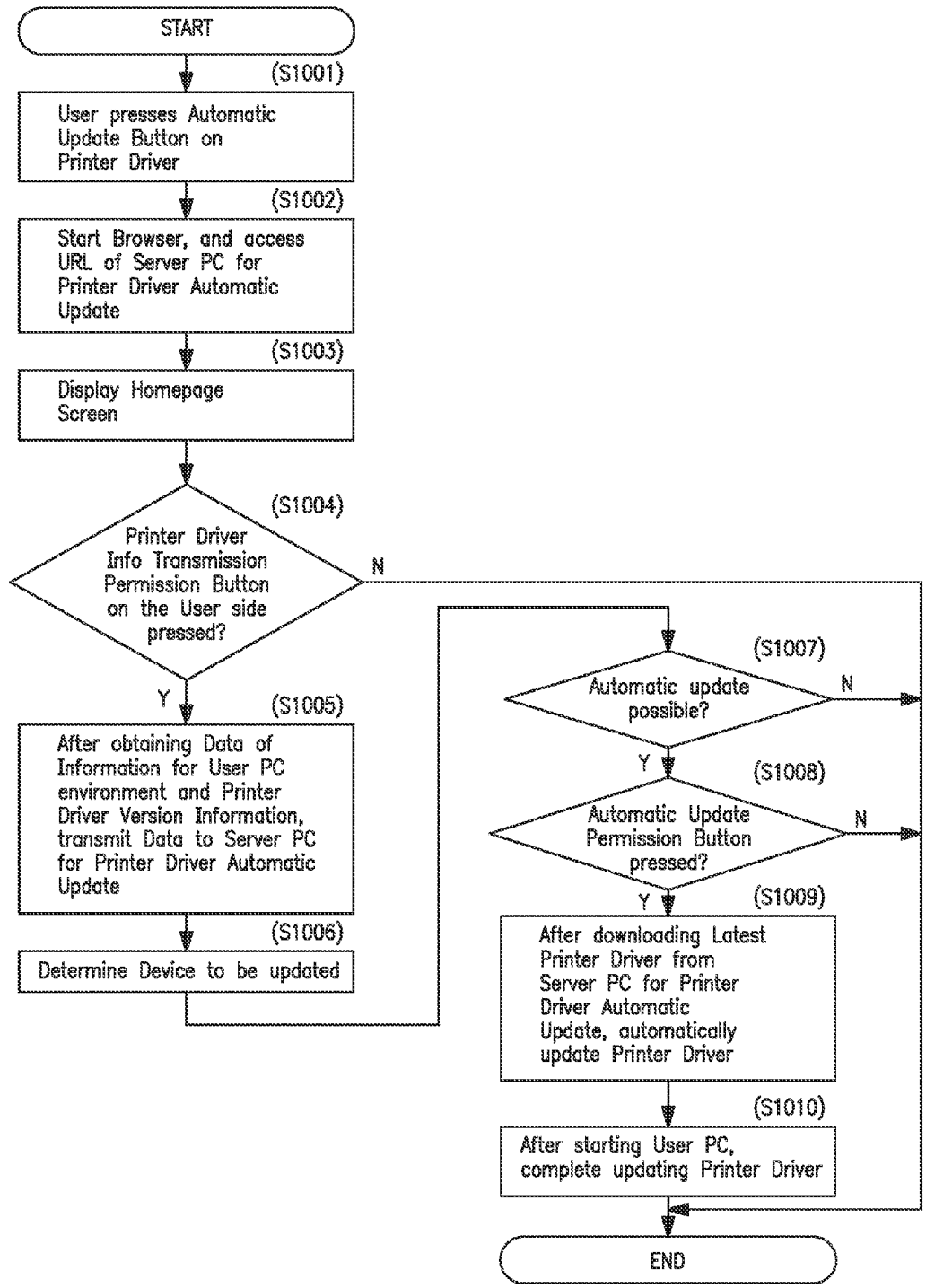
FIG. 5 shows a flowchart indicating one example of a data processing procedure in an information processing apparatus in accordance with an embodiment of the present invention.

FIG. 5 shows a flowchart indicating one example of a data processing procedure including steps S1001-S1010 performed by an information processing apparatus in accordance with an embodiment of the present invention.

Figure 6:
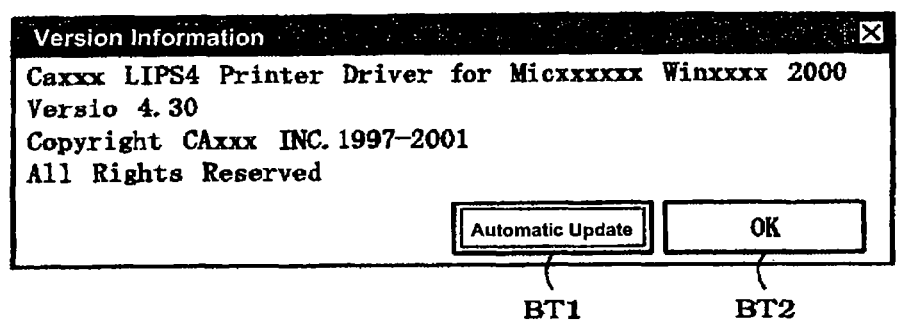
FIG. 6 shows a drawing indicating one example of a printer driver user interface displayed on a display shown in FIG. 2.

First, the printer driver (included in the print processing-related program 204) of the user PC 300 opens on the display 10 a printer driver user interface window (GUI) shown in FIG. 6, based on a user's instruction and displays the version information contained therein. Specifically, the user interface GUI is displayed when a version information button on the printer driver's property screen (omitted from drawings) is pressed.

FIG. 6 shows a drawing indicating one example of the printer driver user interface displayed on the display 10 in FIG. 2.

Figure 7:
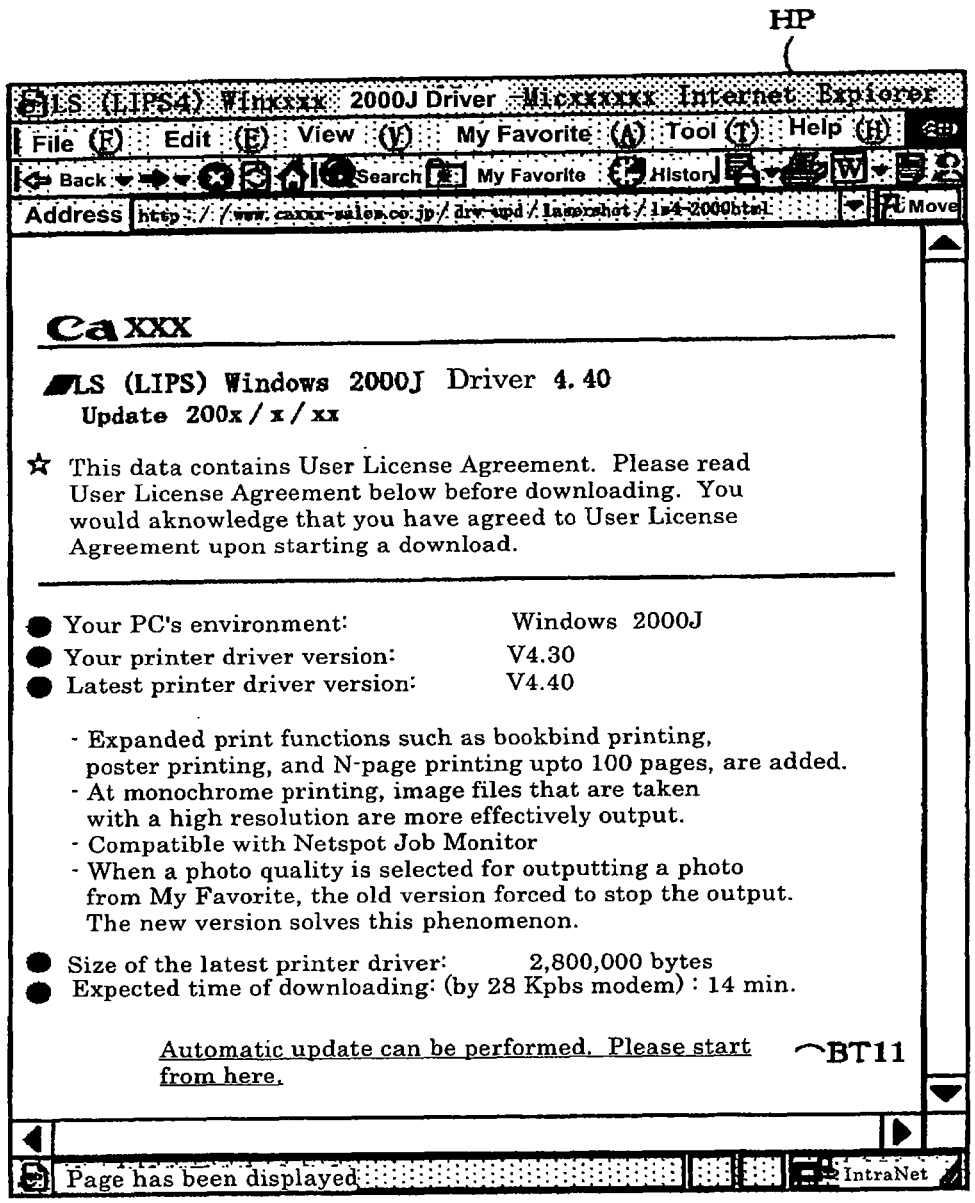
FIG. 7 shows a drawing indicating one example of a driver information homepage display screen displayed on the display in FIG. 2.

In FIG. 6, the BT 1 is the automatic updating button and a BT 2 is an okay button. The GUI displays a message for the printer driver's version information that corresponds to the user PC's OS information. When the automatic updating button BT 1 is selected by a pointing device omitted from drawings, as described above, the printer driver starts a Web browser as shown in FIG. 7 via the OS. The Web browser accesses the server PC 1001 for automatic update of printer drivers in response to the printer driver's notifying the URL to the Web browser; and a homepage HP designated by the manufacturer supplying the driver is displayed on the display 10.

FIG. 7 is a drawing indicating one example of a driver information homepage display screen that is displayed on the display 10 shown in FIG. 2.

First, the user interface window that displays the version information of the printer driver is displayed as shown in FIG. 6. When the user presses the automatic updating button BT 1 (S1001), the printer driver starts the Web browser installed on the user PC 300. When the homepage URL of the server PC 1001 for automatic update of printer drivers registered in the printer driver is notified to the Web browser, the Web browser accesses the server PC 1001 for automatic update of printer drivers (S1002).

When the browser connects with the target URL via the Internet NET, the homepage (in HTML) of the server PC 1001 for automatic update of printer drivers indicated by the URL is downloaded, and a display screen is displayed on the Web browser of the display 10 (S1003).

On the homepage displayed on the Web browser is a button to permit sending the version information of the printer driver on the user PC 2000, and the Web browser detects whether the user has pressed the button to permit sending the version information (S1004).

If the user presses the button to permit sending the version information, the Web browser obtains via the OS the system environment information (including OS type information) and the existing printer driver version information data of the user PC 2000 and sends the data obtained to the server PC for automatic update of printer drivers (such as the server PC 1001 in FIG. 1) (S1005).

On the other hand, if the Web browser detects that the user did not press the button to permit sending the version information in step S1004, the processing is terminated without any further steps.

Next, the server PC 1001 for automatic update of printer drivers determines the correct printer driver for the printer model to be updated based on the system environment information and the existing printer driver version information of the user PC 2000 obtained from the user PC 2000 (S1006). Additionally, the server PC 1001 for automatic update of printer drivers compares the printer driver version information obtained from the user PC 2000 with the latest printer driver version information held by the server PC 1001 for automatic update of printer drivers, and determines whether the printer driver of the user PC 2000 can be automatically updated (S1007).

At this time, the server PC 1001 for automatic update of printer drivers creates HTML display data, which contains the system environment information and printer driver version of the user PC 2000 and the latest printer driver information, in order to display such information on the HP, and sends the display data to the user PC 2000. The display screen displayed on the Web browser of the user PC 2000 is shown in FIG. 7. On the display screen in FIG. 7, there is a button BT 11 to permit an automatic update. The user PC 2000's Web browser detects whether the user presses the button BT 11 (S1008), and terminates the processing if it detects that the button BT 11 is not pressed.

If the user PC 2000's Web browser detects that the user has pressed the button BT 11, the Web browser may send to the user PC 2000 the display image information added by the server PC 1001 for automatic update of printer drivers in order to display on the homepage HP the latest printer driver size and the estimated download time.

If the user PC 2000's Web browser detects that the user has pressed the button BT 11 in step S1008, the latest printer driver is downloaded from the server PC 1001 for automatic update of printer drivers to the user PC 2000. The printer driver is automatically updated when a printer driver installation file that is downloaded to the user PC 2000 is run automatically via the OS and an installation processing of the printer driver is executed (S1009).

Figure 9:
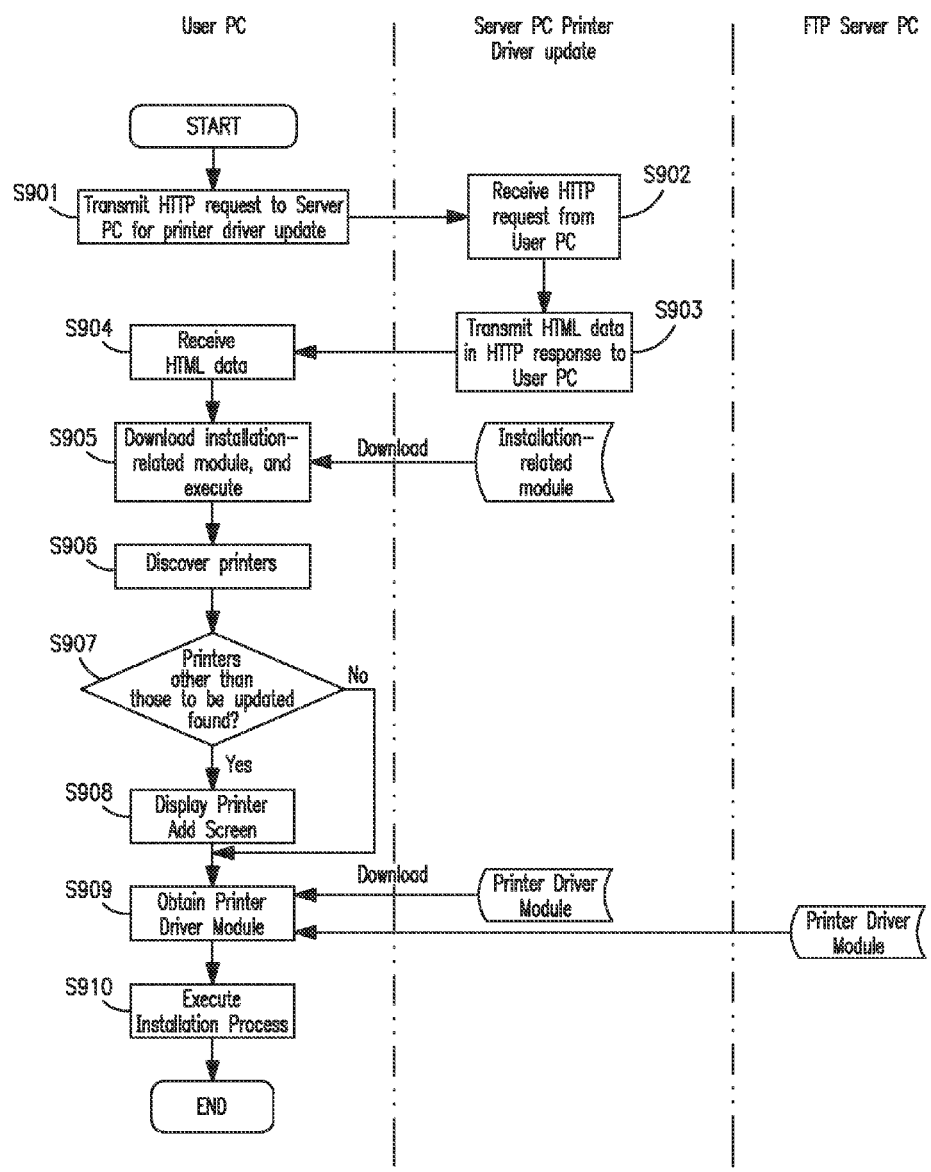
FIG. 9 shows a flowchart indicating a processing procedure for installing a printer driver on an information processing apparatus in accordance with an embodiment of the present invention.

Detailed operations of step S1009 are shown in FIG. 9. First, when the button BT 11 to permit an automatic update is pressed in step S1008, the user PC 2000's Web browser sends an HTTP request to the server PC 1001 for automatic update of printer drivers (S901).

Next, when the server PC 1001 for automatic update of printer drivers receives (S902) the HTTP request that was sent in step S901, the server PC 1001 for automatic update of printer drivers sends the HTML data to the user PC 2000 (S903).

The user PC 2000 receives (S904) the HTML data that was sent from the server PC 1001 for automatic update of printer drivers in the preceding step (S903), and accesses a storage location of installation-related modules described in the HTML received. The user PC 2000 downloads the installation-related modules from the storage location and the downloaded modules are automatically executed (S905). In the example in FIG. 9, the installation-related modules are indicated to be downloaded from the server PC 1001 for automatic update of printer drivers, but the storage location of the installation-related modules may be anywhere as long as it is accessible by the user PC 2000.

When the installation-related modules are executed, printers within the same subnet are discovered (S906). The actual search method utilizes communication protocols such as the SNMP (Simple Network Management Protocol). In this case, only those printers on which printer drivers can be installed may be picked up.

Figure 11:
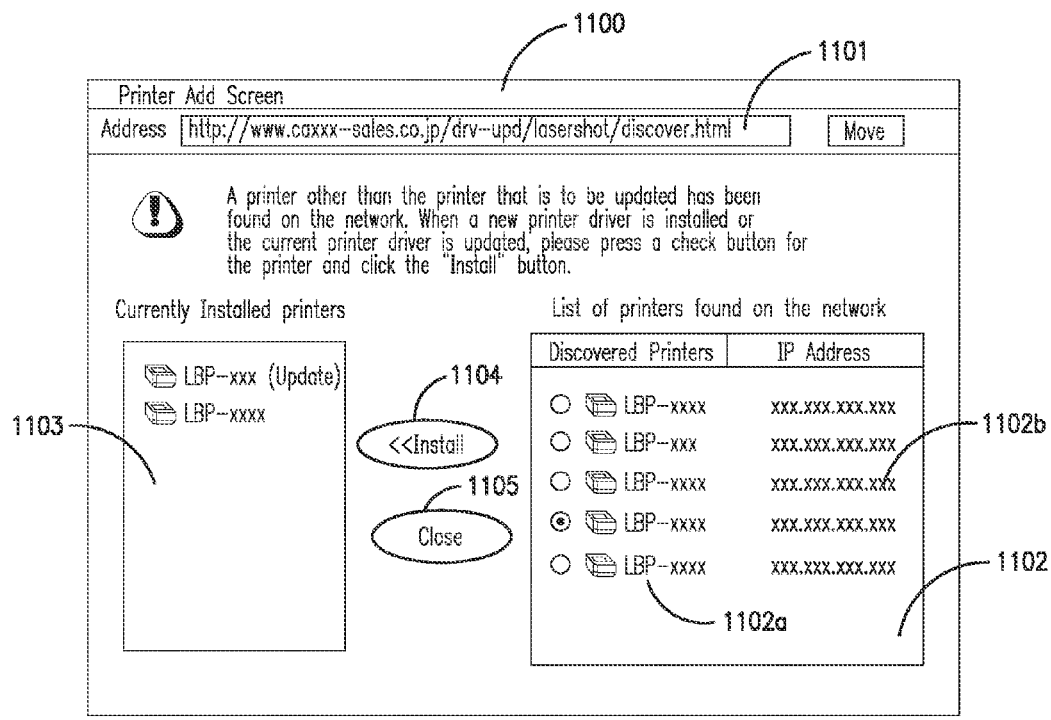
FIG. 11 shows a drawing indicated one example of a printer driver user interface displayed on the display shown in FIG. 2.

In the next step S907, it is determined whether printer models other than the printer model determined in step S1006 are included among the printers discovered in step S906. If it is determined that there are, the processing proceeds to step S908 and a printer add screen such as in FIG. 11 is displayed on the Web browser on the display 10 (S908). On the other hand, if it is determined in step S907 that no printer models other than the printer model determined in step S1006 are included, the processing proceeds to step S909.

The printer add screen in FIG. 11 shows a window 1100, which comprises an area 1101 as an address input area, an area 1102 to display a list of printers found in the network, an area 1103 to display a list of printers whose drivers are already installed on the user PC, a button 1104 as an installation execution button, and a button 1105 as a close button. Here, the user clicks a check button corresponding to one of the items in a list of printers displayed in the area 1102 to select a printer whose driver he or she wants to install in addition to the printer whose driver is to be updated, and clicks the installation button 1104 to proceed to step S909. The user can also select a plurality of printers. In the area 1103 in FIG. 11, icons show "LBP-xxx (update)" to indicate which printers are to be updated.

Figure 10:
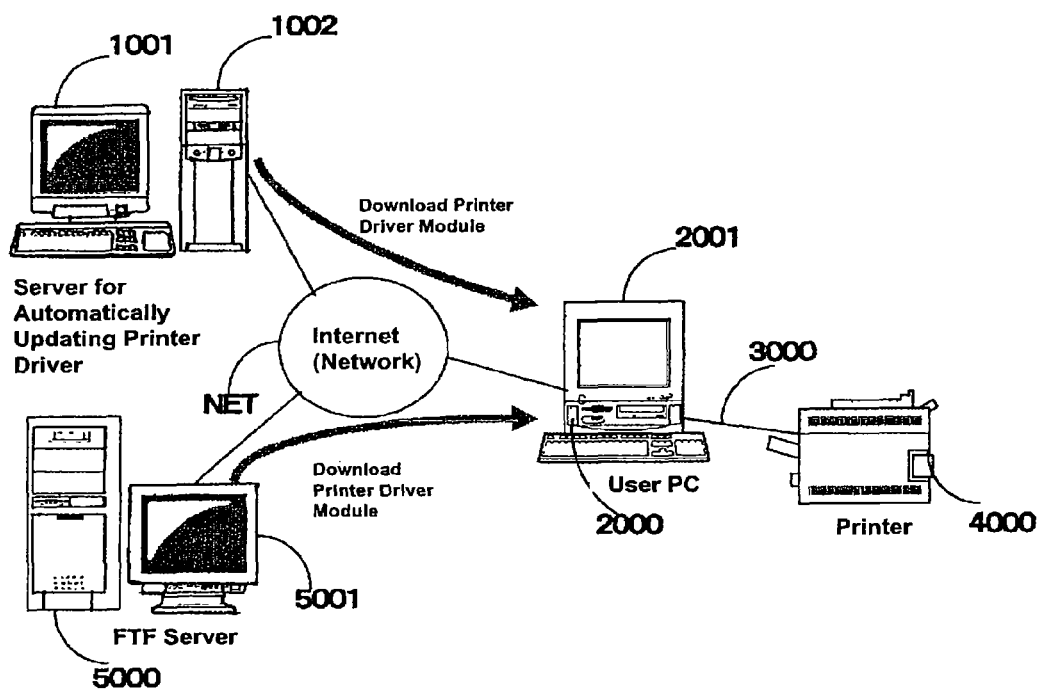
FIG. 10 shows a block diagram illustrating a configuration that makes it possible to download printer driver modules from an information processing apparatus in accordance with an embodiment of the present invention.

In the next step S909, the user PC 2000 obtains driver modules for models selected in step S908 from appropriate locations in the network (S909). Some examples of storage locations for the printer drivers to be obtained are an FTP server 5000 and the server PC 1001 for automatic update of printer drivers as shown in the example in FIG. 10, but the storage location may be anywhere as long as the user PC 2000 can download printer driver modules from the location. The printer driver modules may be included in the installation-related modules that were obtained in step S905.

Next, the printer driver currently installed is updated to the latest version of the printer driver modules obtained in step S909 by the installation-related modules that were downloaded to the user PC 2000 in step S905. If additional printers were selected for installation of printer drivers in step S908, the selected printer drivers are installed for the first time (S910). If this is a new installation, port setting is also done so that the printers will be ready to print as soon as the installation is finished.

After the automatic update of the printer driver is finished, the user is urged to restart the user PC 2000, which completes the printer driver update (S1010).

In the present embodiment, the user PC 2000 accesses the server PC 1001 for automatic update of printer drivers via the network NET. However even when a local network is formed between the network NET and the server apparatus, the latest printer driver can be supplied to a plurality of client PCs that are connected to the local network by having the processing described above performed by the server apparatus. The printer add screen in FIG. 11 may also include the printer model name, IP address and comments for the printer on which the printer driver is to be installed. Further, needless to say, whether the administrator has any authority and the download rate per unit time are also included.

The present invention is as described with reference to particular embodiments. However, many modifications can be made without departing from the present invention.

Although the present invention is implemented on a printer driver in the present embodiment, needless to say, the present invention is applicable to various types of device drivers for various equipment, such as displays, scanners, digital cameras, facsimile machines, mice, speakers, sound source devices, telephones, and copiers.

When the HP (homepage) is displayed on the display 10, the configuration may include a processing to print the content of the homepage with a printer 4000 or store as a file in the external memory 11.

When the printer driver information is sent to the server PC 1001 for automatic update of printer drivers, the user PC 2000 may obtain various resource information from the printer 4000 in order to control to display on the HP the printer's maintenance information, toner cartridge volume discount information and promotional information.

When the URL stored in the printer driver is changed, not only would the Web browser jump automatically to a new URL linked, but the URL will be automatically updated to the latest URL when the latest printer driver is downloaded.

According to the present embodiment, the user can find the homepage of a server PC for automatic update of printer drivers on the Internet simply with a single press of a button on the printer driver user interface window and without having to personally search the latest printer driver, and the latest printer driver can be automatically downloaded by automatic determination of whether update is possible when the user confirms and presses a permit button. The latest printer driver downloaded is updated automatically. The automatic update function can be performed extremely simply, which has an effect of eliminating nuisance for users who want to update their printer drivers.

On the other hand, for printer manufacturers there is an effect of reduced technical support cost, since the present invention will lead to a reduced number of inquiries from users regarding printer driver updates.

Furthermore, since the server PC 1001 for automatic update of printer drivers is browsable on the user PC 2000's Web browser as homepage image information in HTML, the user can use it without being aware of the user PC 2000's OS, and there is an additional effect of not having to provide the server PC 1001 for automatic update of printer drivers for each type of OS.

Next, referring to a memory map in FIG. 8, descriptions will be made as to the configuration of a data processing program readable by a printing system to which a server apparatus and an information processing apparatus according to the present invention are applicable.

Figure 8:
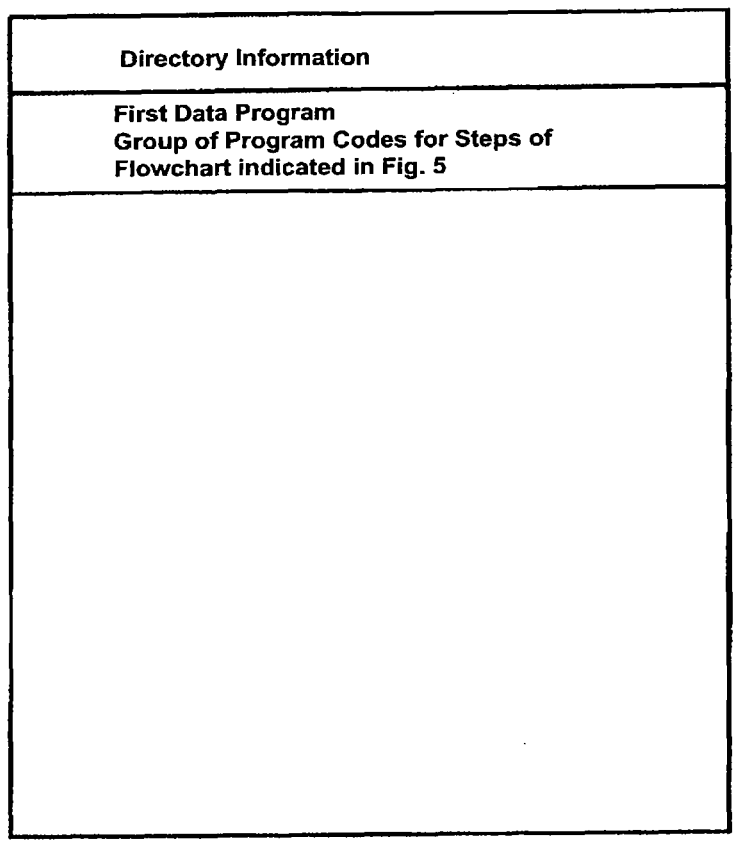
FIG. 8 shows a drawing illustrating a memory map of a storage medium that stores various data processing programs readable by a printing system to which a server apparatus and an information processing apparatus in accordance with an embodiment of the present invention are applicable.

FIG. 8 is a drawing illustrating a memory map of a storage medium that stores various data processing programs readable by a printing system to which is server apparatus and an information processing apparatus according to the present invention are applicable.

Although not indicated in the drawing, information for managing a group of programs stored in the storage medium, such as version information and creator, is also stored. In addition, information dependent on the OS of the device that reads the programs, such as icons that identify and display programs, may be stored in the storage medium.

Furthermore, data dependent on various programs are managed by directories. Programs to install various programs on the computer, as well as extraction programs used when the programs to be installed are compressed, may also be stored in the storage medium.

The functions shown in FIG. 5 according to the present embodiment may be performed by a host computer through a program installed from the outside. In that case, the present invention shall be applicable even when a group of information including the program is supplied to an output device from a storage medium such as a CD-ROM, a flash memory or an FD, or from an external storage medium via a network.

As described above, in accordance with an embodiment of the present invention, an information processing apparatus is provided that is capable of communicating via a predetermined communication medium with a server apparatus that manages device drivers that control devices that perform predetermined data processing. In one aspect, the information processing apparatus has a storage unit (equivalent to the external memory 11 in FIG. 2) that stores a device driver which incorporates information regarding access to the server apparatus and a property display screen with instruction items for instructing a request to update the device driver; a notification unit (equivalent to a processing by software that is stored in the external memory 11 by the CPU 1 and RAM 2 as shown in FIG. 2) that, based on an instruction to instruction items on the property display screen, refers to access information and notifies the access information to a browser in order to obtain driver update page information from the server apparatus; and an update control unit (equivalent to a processing by software that is stored in the external memory 11 by the CPU 1 and RAM 2 as shown in FIG. 2) that, based on an instruction to an updating button, which requests automatic update and which is provided on the driver update page, where the instruction is based on the driver update page information obtained, obtains device driver update information sent from the server apparatus and updates the device driver stored in the storage unit.

In accordance with an another embodiment of the present invention, a server apparatus is provided that is capable of communicating via a predetermined communication medium with an information processing apparatus that stores device drivers that control devices that perform predetermined data processing. In one aspect, the server apparatus has a page information transfer unit (equivalent to a processing by software stored in the external memory by the CPU and the RAM of the server PC 1001 in FIG. 1) that, in response to a driver update page request from the information processing apparatus, transfers driver update page information to the request source, which is the information processing apparatus; a driver management unit (equivalent to a processing by software stored in the external memory by the CPU and the RAM of the server PC 1001 in FIG. 1) that stores and manages a device driver based on management information; an obtaining unit (equivalent to a processing by software stored in the external memory by the CPU and the RAM of the server PC 1001 in FIG. 1) that obtains management information of the device driver and system environment information of the information processing apparatus from the information processing apparatus; a decision-making unit (equivalent to a processing by software stored in the external memory by the CPU and the RAM of the server PC 1001 in FIG. 1) that compares the management information of the device driver obtained by the obtaining unit with the management information managed by the driver management unit, and decides whether the device driver can be updated; and a downloading unit (equivalent to a processing by software stored in the external memory by the CPU and the RAM of the server PC 1001 in FIG. 1) that, if the decision-making unit decides that the device driver can be updated, downloads the latest device driver stored in and managed by the driver management unit to the request source, which is the information processing apparatus.

In accordance with still another embodiment of the present invention, a server apparatus is provided that is capable of communicating via a predetermined communication medium with an information processing apparatus that stores device drivers that control devices that perform predetermined data processing. In one aspect, the server apparatus has a driver management unit (equivalent to a processing by software stored in the external memory by the CPU and the RAM of the server PC 1001 in FIG. 1) that stores and manages a device driver based on management information; an obtaining unit (equivalent to a processing by software stored in the external memory by the CPU and the RAM of the server PC 1001 in FIG. 1) that obtains management information of the device driver that is used in the information processing apparatus; a page information creating unit (equivalent to a processing by software stored in the external memory by the CPU and the RAM of the server PC 1001 in FIG. 1) that creates, in response to a driver update page request from the information processing apparatus, driver update page information that includes the management information of the device driver currently used that was obtained through the obtaining unit, management information of the device driver managed by the driver management unit, and detailed information including information regarding changes made in the device driver managed with respect to an old device driver; and a downloading unit (equivalent to a processing by software stored in the external memory by the CPU and the RAM of the server PC 1001 in FIG. 1) that, in accordance with an instruction to the driver update page information created and transferred to the request source, which is the information processing apparatus, downloads the latest device driver stored in and managed by the driver management unit to the request source, which is the information processing apparatus.

In accordance with yet another embodiment of the present invention, there is provided a driver updating method performed at an information processing apparatus that is capable of communicating via a predetermined communication medium with a server apparatus that manages device drivers that control devices that perform predetermined data processing. In one aspect, the driver updating method includes a displaying step (the user interface window (GUI) in FIG. 6) to display on a display unit a property display screen with an instruction section to instruct a request to update a device driver; an obtaining step (step S1002 in FIG. 5) to refer, based on an instruction to an instruction section displayed on the display unit (step S1001 in FIG. 5), access information incorporated in the device driver and to obtain driver update page information from the server apparatus; a browsing step (step S1003 in FIG. 5) to display, based on the driver update page information obtained in the obtaining step, the driver update page provided with an updating button to request automatic update; and an update control step (steps S1004-S1009 in FIG. 5) to transfer management information of the device server and resource information of the information processing apparatus to the server apparatus, to obtain update information sent from the server apparatus in response to the information transferred, and to update the device driver stored in the storage unit, based on the instruction to the updating button.

In accordance with a further embodiment of the present invention, there is provided a driver updating method performed at a server apparatus that is capable of communicating via a predetermined communication medium with an information processing apparatus that stores device drivers that control devices that perform predetermined data processing. In one aspect, the driver updating method includes a page information transfer step (step S1003 in FIG. 5), to transfer, in response to a driver update page request from the information processing apparatus, driver update page information to the request source, which is the information processing apparatus; a driver management step (omitted from drawings) to store and manage a device driver based on management information; an obtaining step (step S1005 in FIG. 5) to obtain management information of the device driver and system environment information of the information processing apparatus from the information processing apparatus; a decision-making step (step S1007 in FIG. 5) to compare the management information of the device driver obtained in the obtaining step with the management information managed by the driver management step, and decides whether the device driver can be updated; and a downloading step (step S1008 and S1009 in FIG. 5) to download the latest device driver stored in and managed by the driver management step to the request source, which is the information processing apparatus, if it is decided in the decision-making step that the device driver can be updated.

Needless to say, the present invention is achieved when a storage medium, which stores program codes of software that realize the functions of the embodiment described above, is supplied to a system or a device, and a computer (or CPU or an MPU) of the system or the device reads the program codes stored in the storage medium and executes them.

In this case, the program codes themselves that are read from the storage medium realize new functions of the invention, and the storage medium that stores the program codes constitutes the present invention.

The storage medium on which to supply the program codes may be a Floppy (a registered trademark) disk, a flexible disk, a hard disk, an optical disk, an optical magnetic disk, a CD-ROM, a CD-R, a CD-RW, a DVD, a magnetic tape, a non-volatile memory card, a ROM, or an EEPROM.

Furthermore, needless to say, the present invention is applicable not only when the program codes read by a computer are executed to realize the functions of the embodiments described above, but also when an operating system (OS) that operates on the computer performs a part or all of the actual processing based on the instructions contained in the program codes and thereby realizes the functions of the embodiments described above.

Moreover, the present invention is also applicable when the program codes that are read from the storage medium are written onto an expansion board inserted into a computer or on a memory of an expansion unit connected to a computer, and a CPU provided on the expansion board or the expansion unit performs a part or all of the actual processing based on the instructions contained in the program codes and thereby realizes the functions of the embodiments described above.

As described above, with an information processing apparatus, a driver updating method, a storage medium and a program in accordance with the embodiments of the present invention, for example with an information processing apparatus that is capable of communicating via a predetermined communication medium with a server apparatus that manages device drivers that control devices that perform predetermined data processing, when a property display screen with an instruction section to instruct a request to update a device driver is displayed, when the device driver is started, access information is referred to and driver update page information is obtained from the server apparatus based on an instruction to the instruction section; after a driver update page with an updating button to request automatic update based on the driver update page information obtained is displayed, management information of the device driver and resource information of the information processing apparatus are transferred to the server apparatus based on the instruction to the updating button, update information sent from the server apparatus in response to the information transferred is obtained, and the device driver stored in a storage section is updated. By doing the above, a highly convenient driver updating environment, in which the operational burden in terms of various network information that must be set by the user is reduced and an updating processing of device drivers can be efficiently performed with simple operations on an information processing apparatus using a general-purpose browser, can be freely created when updating a device driver.

With a server apparatus, a driver updating method, a storage medium and a program in accordance with the embodiments of the present invention, for example with a server apparatus that is capable of communicating via a predetermined communication medium with an information processing apparatus that stores device drivers that control devices that perform predetermined data processing, when driver update page information is transferred to the request source, which is the information processing apparatus, in response to a driver update page request from the information processing apparatus, management information of the device driver and resource information of the information processing apparatus are obtained from the information processing apparatus, the management information of the device driver obtained and management information managed by a driver management unit are compared, and whether the device driver can be updated is determined; if it is determined that it can be updated, the latest device driver stored in and managed by a driver management unit is downloaded to the request source, which is the information processing apparatus. By doing the above, a highly convenient driver updating environment, in which a series of operations to refer to update information of the device driver becomes a starting point to automatically update the device driver on the information processing apparatus while presenting to the information processing apparatus information required for driver update, can be freely created.

Needless to say, environment information and driver information collected from the information processing apparatus according to the present invention include software names, such as printer driver names, software type information (for example, application or printer driver), information on languages that can be used in the system and software versions.

What is claimed is:
1. A method for use with an information processing apparatus, the method comprising:
   a transmitting step of transmitting, from the information processing apparatus to a server apparatus, environment information of the information processing apparatus;
   a receiving step of receiving from the server apparatus a printer type for which an installed printer driver is to be updated;
   a searching step of searching for printers provided on a network;
   a display step that displays a screen including (a) a first area on which the printer corresponding to the printer type received by the receiving step is displayed, and (b) a second area that allows a user to select at least one printer of the printers found in the searching step; and
   a driver receiving step that receives from the network, both a printer driver corresponding to the printer displayed on the first area and a printer driver corresponding to the at least one printer selected on the second area, in accordance with a single install instruction provided via the displayed screen, wherein, by using the received printer drivers, the installed printer driver is updated and the printer driver corresponding to the at least one printer selected on the second area is newly installed.

2. The method according to claim 1, wherein, in a case that a printer other than the printer corresponding to the printer type received in the receiving step is not found in the searching step, the driver receiving step receives the printer driver corresponding to the printer type received in the receiving step without displaying the second screen in the display step.

3. The method according to claim 1, further comprising an install control step that installs a module downloaded from the server apparatus, wherein the searching step searches for printers provided on the network in accordance with the installation of the module.

4. An information processing apparatus for communication with a server apparatus, the information processing apparatus comprising at least a processor functioning as at least one of:
- a communication unit that (a) transmits environment information of the information processing apparatus to the server apparatus and (b) receives from the server apparatus a printer type for which an installed printer driver is to be updated;
- a search unit that searches for printers provided on a network;
- a display unit that displays a screen including (a) a first area on which the printer corresponding to the printer type received by the communication unit is displayed and (b) a second area that allows a user to select at least one printer of the printers found by the search unit; and
- a driver reception unit that receives from the network, both a printer driver corresponding to the printer displayed on the first area and a printer driver corresponding to the at least one printer selected on the second area, in accordance with a single install instruction provided via the displayed screen, wherein, by using the received printer drivers, the installed printer driver is updated and the printer driver corresponding to the at least one printer selected on the second area is newly installed.

5. The information processing apparatus according to claim 4, wherein, in a case that a printer other than the printer corresponding to the printer type received by the communication unit is not found by the search unit, the driver reception unit receives the printer driver corresponding to the printer type received by the communication unit without displaying the second screen by the display unit.

6. The information processing apparatus according to claim 4, wherein the processor further functions as an install control unit that installs a module downloaded from the server apparatus, wherein the search unit searches for printers provided on the network in accordance with the installation of the module.

7. An apparatus-readable storage medium storing a program which, when executed by an apparatus, causes the apparatus to perform the method according to claim 1.

8. The apparatus-readable storage medium according to claim 7, wherein, in a case that a printer other than the printer corresponding to the printer type received in the receiving step is not found in the searching step, the driver receiving step receives the printer driver corresponding to the printer type received in the receiving step without displaying the second screen in the display step.

9. The apparatus-readable storage medium according to claim 7, wherein the method further comprises an install control step that installs a module downloaded from the server apparatus, wherein the searching step searches for printers provided on the network in accordance with the installation of the module.

\* \* \* \* \*